United States Patent
Hussaini

(10) Patent No.: US 10,727,520 B2
(45) Date of Patent: Jul. 28, 2020

(54) FUEL CELL STACK ASSEMBLY

(71) Applicant: CUMMINS ENTERPRISE LLC, Indianapolis, IN (US)

(72) Inventor: Irfan Saif Hussaini, Glenville, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 0 days.

(21) Appl. No.: 15/652,448

(22) Filed: Jul. 18, 2017

(65) Prior Publication Data

US 2019/0027774 A1 Jan. 24, 2019

(51) Int. Cl.
| | |
|---|---|
| H01M 8/0258 | (2016.01) |
| H01M 8/0265 | (2016.01) |
| H01M 8/0267 | (2016.01) |
| H01M 8/04007 | (2016.01) |
| H01M 8/2425 | (2016.01) |
| H01M 8/2404 | (2016.01) |
| H01M 8/12 | (2016.01) |
| H01M 8/2484 | (2016.01) |
| H01M 8/1246 | (2016.01) |
| H01M 8/124 | (2016.01) |

(52) U.S. Cl.
CPC ....... *H01M 8/2425* (2013.01); *H01M 8/0258* (2013.01); *H01M 8/04007* (2013.01); *H01M 8/04037* (2013.01); *H01M 8/04074* (2013.01); *H01M 8/12* (2013.01); *H01M 8/1246* (2013.01); *H01M 8/2404* (2016.02); *H01M 8/2484* (2016.02); *H01M 2008/1293* (2013.01)

(58) Field of Classification Search
CPC .................................................. H01M 8/00
See application file for complete search history.

(56) References Cited

U.S. PATENT DOCUMENTS

| | | | | |
|---|---|---|---|---|
| 5,501,781 A | * | 3/1996 | Hsu | F02C 3/36 204/269 |
| 6,416,899 B1 | * | 7/2002 | Wariishi | H01M 8/2483 429/446 |

(Continued)

FOREIGN PATENT DOCUMENTS

| | | |
|---|---|---|
| DE | 10207864 A1 | 9/2003 |
| DE | 10 2014 211279 A1 | 12/2015 |

(Continued)

OTHER PUBLICATIONS

Abbasi and Jiang, "Design and Analysis of a Fuel Cell/Gas Turbine Hybrid Power System," IEEE Power and Energy Society General Meeting—Conversion and Delivery of Electrical Energy in the 21st Century, pp. 1-6, (Jul. 20-24, 2008.

(Continued)

*Primary Examiner* — James Lee
(74) *Attorney, Agent, or Firm* — Barnes & Thornburg LLP

(57) ABSTRACT

A fuel cell stack assembly is presented. The fuel cell stack assembly includes a plurality of fuel cells and a plurality of interconnect plates. In the fuel cell stack assembly, each interconnect plate of the plurality of interconnect plates is disposed between a pair of fuel cells of the plurality of fuel cells. The fuel cell stack assembly further includes a plurality of reactant manifolds defined by the plurality of interconnect plates and a heating element disposed in a reactant manifold of the plurality of reactant manifolds.

17 Claims, 6 Drawing Sheets

(56) References Cited

U.S. PATENT DOCUMENTS

| | | |
|---|---|---|
| 6,692,859 B2 | 2/2004 | Mukerjee et al. |
| 7,147,953 B2 | 12/2006 | Haltiner, Jr. et al. |
| 7,208,246 B2 | 4/2007 | Herman et al. |
| 7,374,834 B2 | 5/2008 | Jewulski et al. |
| 7,732,076 B2 | 6/2010 | Zheng et al. |
| 8,356,682 B2 | 1/2013 | Grieve |
| 8,367,265 B2 | 2/2013 | Salvatore et al. |
| 8,535,839 B2 | 9/2013 | Perry et al. |
| 8,883,364 B2 | 11/2014 | Ko et al. |
| 9,054,352 B2 | 6/2015 | Dong et al. |
| 2002/0068202 A1 | 6/2002 | Gebhardt et al. |
| 2003/0054215 A1 | 3/2003 | Doshi et al. |
| 2003/0096147 A1 | 5/2003 | Badding et al. |
| 2005/0142421 A1 | 6/2005 | Lisgaras et al. |
| 2006/0166051 A1* | 7/2006 | Murthy ............. H01M 8/04238 429/432 |
| 2008/0318100 A1* | 12/2008 | Owejan ............... H01M 8/0228 429/429 |
| 2012/0070761 A1* | 3/2012 | Goebel ............... H01M 8/0278 429/459 |
| 2015/0162637 A1 | 6/2015 | Ricci-Ottati et al. |
| 2016/0006047 A1 | 1/2016 | Pedersen |
| 2017/0092964 A1 | 3/2017 | Hickey et al. |

FOREIGN PATENT DOCUMENTS

| | | |
|---|---|---|
| JP | S58-201266 A | 11/1983 |
| JP | 2002-313403 A | 10/2002 |
| JP | 2003-346869 A | 12/2003 |
| JP | 2007-213883 A | 8/2007 |
| WO | 2014/139823 A1 | 9/2014 |

OTHER PUBLICATIONS

Duhn et al., "Optimization of a new flow design for solid oxide cells using computational fluid dynamics modelling," Journal of Power Sources, vol. 336, pp. 261-271, (Dec. 30, 2016).

Gkanas et al., "Coupling Thermal Integration of a Solid Oxide Fuel Cell with a Magnesium Metal Hydride Tank," Cornell University Library, pp. 1-16, (Dec. 2014).

Nguyen et al., "PEM Fuel Cell Heat Recovery for Preheating Inlet Air in Standalone Solar-Hydrogen Systems for Telecommunication Applications: An Energy Analysis", International Journal of Hydrogen Energy, vol. 41, No. 40, pp. 2987-3003, (Jan. 2016).

Wang and Wang, "Discrete approach for flow field designs of parallel channel configurations in fuel cells," International Journal of Hydrogen Energy, vol. 37, Issue 14, pp. 10881-10897, (Jul. 2012).

Extended European Search Report and Opinion issued in connection with corresponding EP Application No. 18183616.4 dated Nov. 19, 2018.

* cited by examiner

FUEL CELL STACK ASSEMBLY

Embodiments of the present disclosure generally relate to fuel cells, for example solid-oxide fuel cells.

BACKGROUND

Fuel cells are one of the promising technologies for power generation. A fuel cell is an electrochemical device that converts chemical energy produced by a reaction directly into electrical energy. Fuel cells typically include an anode (or a fuel electrode), a cathode (or an oxidant electrode), and an electrolyte. These fuel cells, like batteries, react fuel and oxidant to produce electricity. However, unlike batteries, fuel such as hydrogen and oxidant such as air are supplied continuously to the fuel cell so that it continues to produce power as long as such reactants are provided.

Since individual fuel cells produce power at a low voltage, for example less than about 1 Volt per cell, multiple fuel cells are typically assembled in a fuel cell stack to produce power at useful voltages. In a stack arrangement with planar fuel cells, individual fuel cells that include layered fuel cell structures and individual interconnects that conduct current from one fuel cell to another fuel cell, are alternately arranged. The stacking of the fuel cells may address the reactants (fuel and oxidant) flow distribution in the stack through internal manifolds. The most common designs in planar stack arrangements are a cross-flow arrangement and a parallel-flow arrangement. In addition, since fuel cells, such as solid-oxide fuel cells typically operate at a high temperature (for example, higher than 600 degrees Celsius), an external heat source may be used to start-up and/or heat the reactant(s) to a temperature sufficient for the operation of the fuel cells when required.

However, the performance of the fuel cell stacks may be limited by the non-uniform flow distribution of reactants and temperature across the stack. Generally, the fuel cells near an inlet of a manifold may receive more flow than the fuel cells far from the inlet. This non-uniform flow distribution of reactants may lead to non-uniform temperature across the stack which leads to sub-par operating condition for the stack.

There is a need for alternative configurations of fuel cell stack assemblies for providing improved performance for the operation of the fuel cells.

BRIEF DESCRIPTION

In one aspect, provided herein is a fuel cell stack assembly. The fuel cell stack assembly includes a plurality of fuel cells, a plurality of interconnect plates, where each interconnect plate of the plurality of interconnect plates is disposed between a pair of fuel cells of the plurality of fuel cells, a plurality of reactant manifolds defined by the plurality of interconnect plates, and a heating element disposed in a reactant manifold of the plurality of reactant manifolds.

In one aspect, a fuel cell stack assembly includes a plurality of fuel cells, a plurality of interconnect plates, where each interconnect plate of the plurality of interconnect plates is disposed between a pair of fuel cells of the plurality of fuel cells, a plurality of reactant manifolds defined by the plurality of interconnect plates, and a longitudinal element disposed in a reactant manifold of the plurality of reactant manifolds. The longitudinal element extends along a length of the reactant manifold and has a varying cross-section area along the length.

These and other features, embodiments, and advantages of the present disclosure may be understood more readily by reference to the following detailed description.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
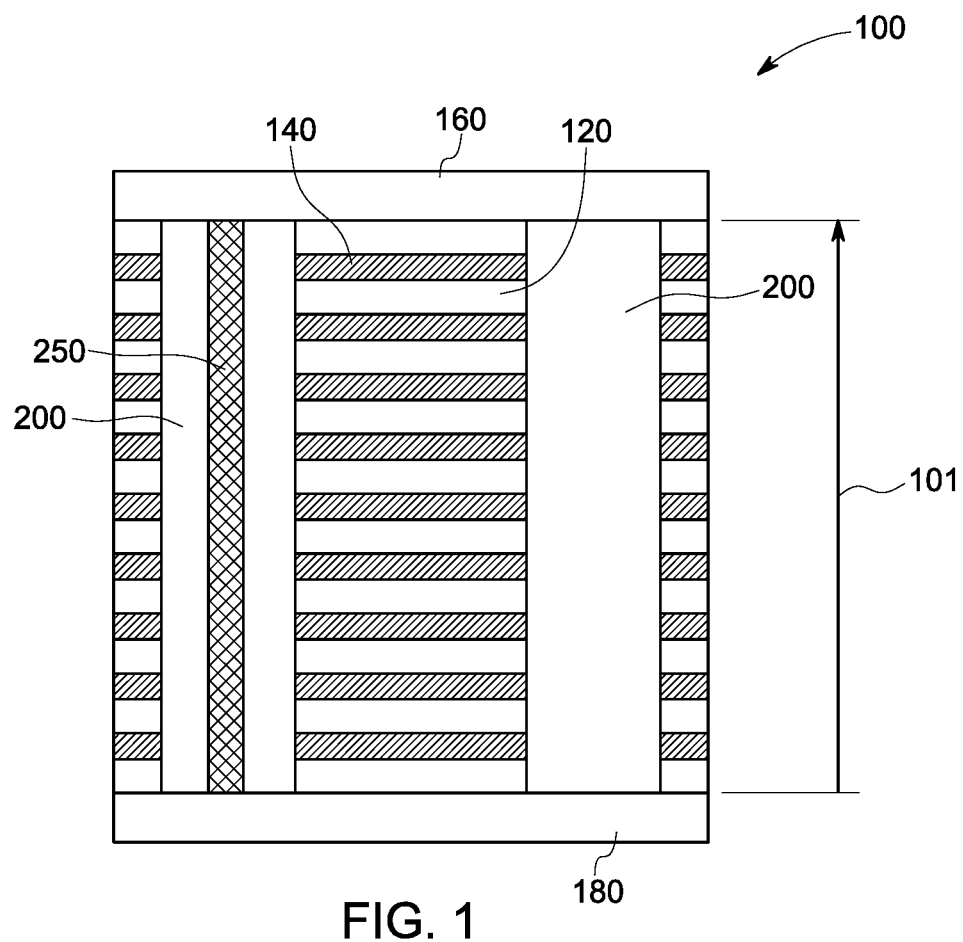
FIG. 1 is a schematic of a vertical cross-sectional view of a fuel cell stack assembly, in accordance with one embodiment of the disclosure.

The present configuration of the fuel cell stack assembly as described herein provides improved heating of reactants for the operation of the fuel cells (for example, solid-oxide fuel cells) in the stack assembly. In some embodiments, the fuel cell stack assembly includes an integrated heating element. In addition, some embodiments of the present configuration provide improved flow management of the reactants in the fuel cell stack assembly, and thus improves performance of the fuel cells. The terms, "fuel cell stack assembly" and "stack assembly" are used herein interchangeably, throughout the specification.

As used herein, the term "integrated heating element" refers to a heating element that is disposed within a portion of a fuel cell stack assembly. In some embodiments, the heating element is disposed within a reactant manifold of the fuel cell stack. That is, the heating element is integrated with a portion of the stack assembly.

In the following specification and the claims, the singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about" and "substantially", is not limited to the precise value specified. In some instances, the approximating language may correspond to the precision of an instrument for measuring the value.

The terms "first", "second", and the like, as used herein do not denote any order, quantity, or importance, but rather are used to distinguish one element from another.

As used herein, the terms "high operating temperature", "high temperature" and "elevated temperature" refer to an operating temperature that is higher than 600 degrees Celsius of a fuel cell for example, a solid-oxide fuel cell. In some embodiments, the operating temperature of the fuel cell is higher than 700 degrees Celsius. In some embodiments, the operating temperature is in a range of from about 800 degrees Celsius to 1000 degrees Celsius.

The term "reactant manifold" as used herein refers to a passage, channel or conduit for supplying a reactant to at least one fuel cell of the fuel cell stack assembly. In some embodiments, the reactant manifold is an internal manifold that is defined by a plurality of interconnect plates in the stack assembly. The reactant manifold may be a fuel manifold or an oxidant manifold.

Some embodiments of the present disclosure are directed to a fuel cell stack assembly. The fuel cell stack assembly includes a plurality of fuel cells, a plurality of interconnect plates, wherein each interconnect plate of the plurality of interconnect plates is disposed between a pair of adjacent fuel cells of the plurality of fuel cells, a plurality of reactant manifolds defined by the plurality of interconnect plates and a heating element disposed in at least one reactant manifold of the plurality of reactant manifolds. That is, in some embodiments as described herein, the fuel cell stack assembly includes an integrated heating element. In some embodiments, a plurality of heating elements is disposed in the plurality of reactant manifolds. In some embodiments, one heating element of the plurality of heating elements is disposed in each reactant manifold of the plurality of reactant manifolds.

Figure 2:
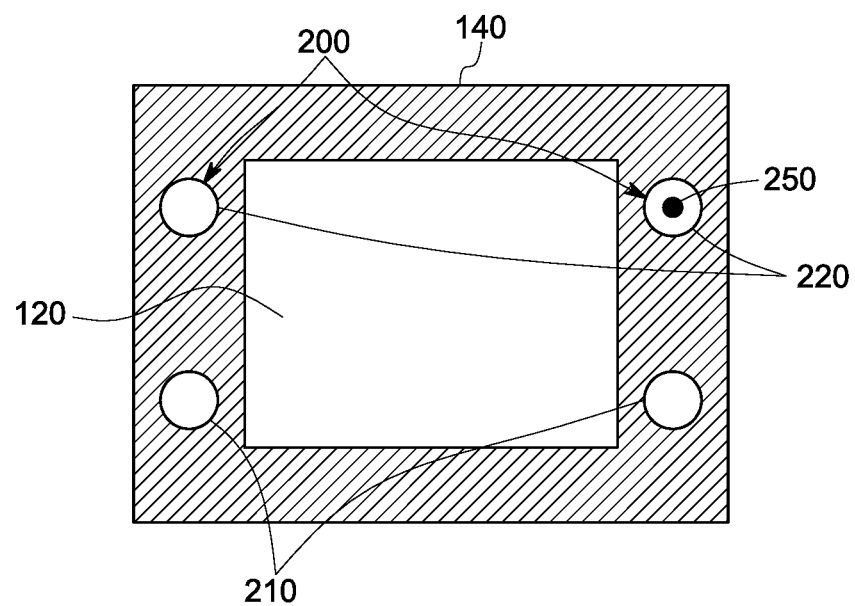
FIG. 2 is a schematic of a horizontal cross-sectional view of a fuel cell stack assembly, in accordance with one embodiment of the disclosure.

FIG. 1 is a schematic of a vertical cross-sectional view of a fuel cell stack assembly 100, in some embodiments. FIG. 2 is a schematic of a horizontal cross-sectional view of the fuel cell stack assembly 100, in some embodiments. The fuel cell stack assembly 100 includes a plurality of fuel cells 120 and a plurality of interconnect plates 140. An interconnect plate 140 of the plurality of interconnect plates is disposed between a pair of fuel cells 120 of the plurality of fuel cells. The fuel cell stack assembly 100 is a planar-type, interconnect-supported fuel cell stack, in which each pair of adjacent fuel cells 120 of the plurality of fuel cells is separated by an interconnect plate 140 of the plurality of interconnect plates. In other words, each fuel cell 120 extends between two adjacent interconnect plates 140 of the plurality of interconnect plates.

In some embodiments, the fuel cell stack assembly 100 includes a top stack plate 160 and a bottom stack plate 180. In some embodiments, the top stack plate 160, the bottom stack plate 180, and the plurality of interconnect plates 140, are each sized identically. In some other embodiments, at least one of the top stack plate 160, the bottom stack plate 180 and the plurality of interconnect plates 140 is sized differently. The top and bottom stack plates 160 and 180 are fabricated from an electrically-conductive material. For example, the top and bottom stack plates 160 and 180 may be fabricated from conductive materials capable of operating at a high temperature as described herein, such as, any material that is electrically conductive, or any material that if subject to oxidation, its oxide is conductive. Each interconnect plate 140 is also fabricated from an electrically conductive material capable of operating at high temperatures as described herein, such as, but is not limited to, a stainless steel.

The plurality of fuel cells 120 and the plurality of interconnect plates 140, independently, may have any cross-sectional shape for example, circle, ellipse, polygon such as square, rectangle, pentagon, or hexagon. In some embodiments, the plurality of interconnect plates 140 is different in shape and size from the plurality of fuel cells 120. In some embodiments, the plurality of interconnect plates 140 is larger in size than the plurality of fuel cells 120.

Figure 3:
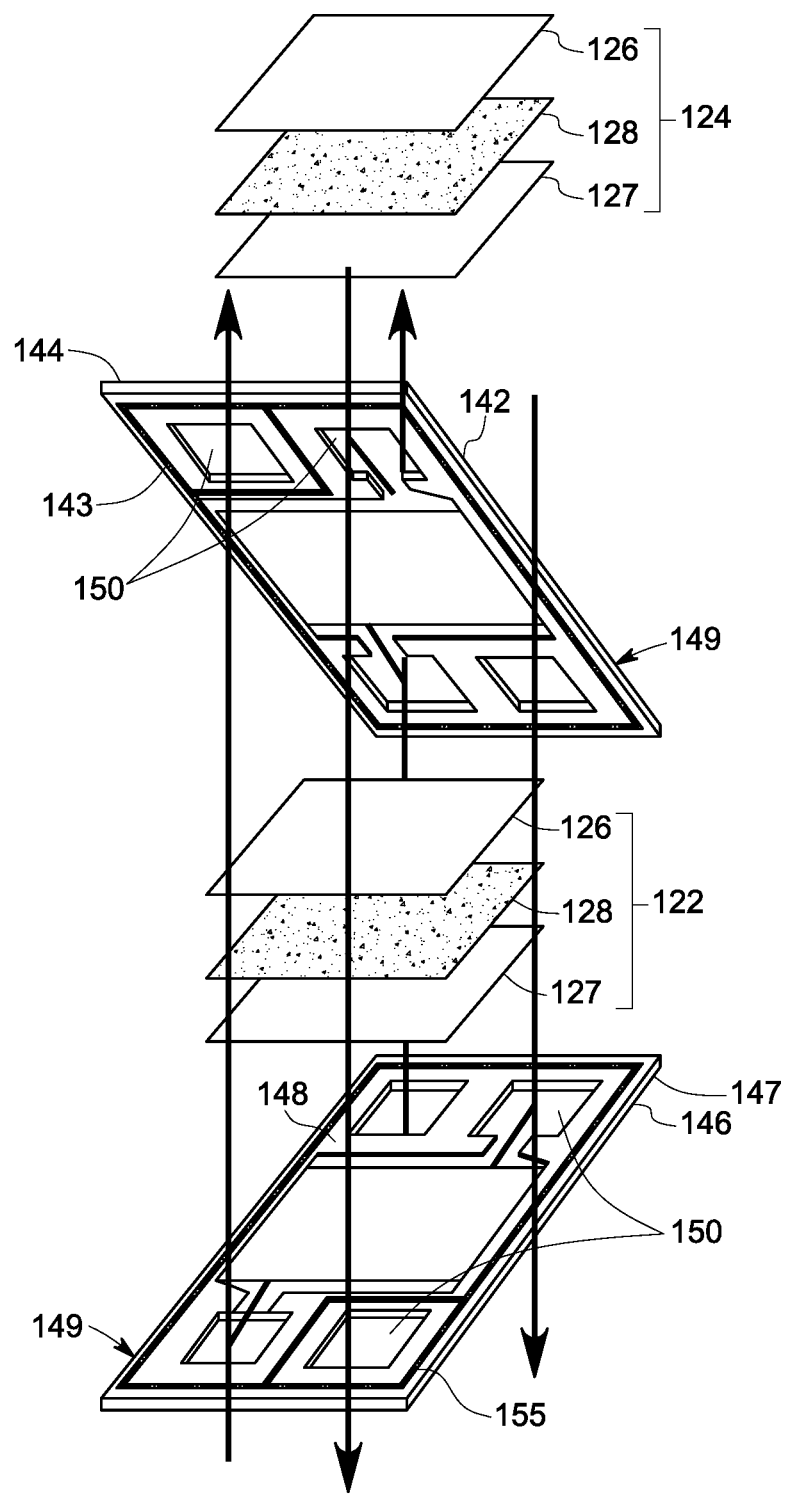
FIG. 3 is a schematic of an exploded view of a portion of the fuel cell stack assembly of FIG. 1, in accordance with one embodiment of the disclosure.

In some embodiments, each fuel cell 120 includes an anode layer, a cathode layer and an electrolyte layer interposed between the anode layer and the cathode layer (shown in FIG. 3). In some embodiments, the plurality of fuel cells 120 includes solid-oxide fuel cells. The electrolyte layer of each fuel cell 120 may be fabricated from a material that is capable of transporting an oxide ion. In one embodiment, the electrolyte layer is fabricated from a material such as, but is not limited to, yttrium-stabilized Zirconia (YSZ), and cathode layer may include, but is not limited to, lanthanum strontium manganate (LSM).

In the fuel cell stack assembly 100, the plurality of fuel cells 120 are electrically coupled together in series. The plurality of fuel cells 120 are coupled to enable electricity to be conducted from one fuel cell to an adjacent fuel cell through the interconnect plate 140 between them. The plurality of interconnect plates 140, in the fuel cell stack assembly 100, are arranged such that a plurality of reactant manifolds 200 is defined by the plurality of interconnect plates 140.

FIG. 3 is an exploded view of a portion of the fuel cell stack assembly 100 of FIGS. 1 and 2, in some embodiments. FIG. 3 shows two fuel cells of the plurality of fuel cells 120: a first fuel cell 122 and a second fuel cell 124; and two interconnect plates: a first interconnect plate 142 and a second interconnect plate 146 arranged in the fuel cell stack assembly 100. In some embodiment, the first fuel cell 122 and the second fuel cell 124, individually, include an anode layer 126, a cathode layer 127 and an electrolyte layer 128 interposed between the anode layers 126 and the cathode layer 127. In the fuel cell stack assembly 100, the first interconnect plate 142 is disposed between the anode layer 126 of the first fuel cell 122 and the cathode layer 127 of the second fuel cell 124. The first interconnect plate 142 defines an anode chamber (not shown in figures) between a first surface 143 of the first interconnect plate 142 and the anode layer 126 of the first fuel cell 122, and a cathode chamber (not shown in figures) between a second surface 144 of the first interconnect plate 142 and the cathode layer 127 of the second fuel cell 124. Similarly, the second interconnect plate 146 defines an anode chamber between a first surface 147 of the second interconnect plate 146 and an anode layer of an adjacent fuel cell (not shown in FIGS. 3) and a cathode chamber between a second surface 148 of the second interconnect plate 146 and the cathode layer 127 of the first fuel cell 122.

As illustrated in FIG. 3, the first and second interconnect plates 142 and 146 are identical in shape and size, and different in shape and size from the first and second fuel cells 122 and 124. The first and second interconnect plates 142 and 146 have extended portions 149 when arranged alternately with the first and second fuel cells 122 and 124 in the stack assembly 100. No portion of the first and second fuel cells 122 and 124 exists between the extended portions 149 of the first and second interconnect plates 142 and 146. The extended portions 149 of the first and second interconnect plates 142 and 146 include a plurality of openings 150. The plurality of openings 150 of the first interconnect plate 142 and the plurality of opening of the second interconnect plate 146 are aligned in the stack assembly 100. In some embodiments, a plurality of seal members 155 is disposed between the adjacent first and second interconnects 142 and 146. The plurality of seal members 155 facilitates electrically isolating the first fuel cell 122 and the second fuel cell 124 to prevent short-circuiting between the first fuel cell 122 and the second fuel cell 124. Each seal members 155 includes a hollow electrical insulator that may be fabricated from, but is not limited to, a ceramic, glass, composite or mica. In one embodiment, the plurality of seal members 155 may include composites of ceramic and glass such as $CaO$—$SiO_2$ and $BaO$—$Al_2O_3$—$SiO_2$.

Referring to FIGS. 1-3, when the plurality of seal members 155 is coupled between the extended portions 149 of the adjacent interconnect plates of the plurality of interconnect plates 140, the plurality of reactant manifolds 200 is defined. In these instances, the plurality of reactant manifolds 200 extends from the bottom stack plate 180 to the top stack plate 160 i.e., to a height (shown by arrow 101) of the fuel cell stack assembly 100. In some embodiments, the reactants (for example, fuel and air) of the fuel cells 120 are supplied to, and channeled from, the fuel cell stack assembly 100 through the plurality of reactant manifolds 200. That is, the reactants are internally manifolded in the fuel cell stack assembly 100. Such plurality of reactant manifolds 200 defined by aligned openings of the plurality of interconnect plates 140 in the fuel cell stack assembly 100, can be referred to as internal manifolds.

Referring to FIG. 2, the plurality of reactant manifolds 200 may include at least one pair of fuel manifolds 210 and at least one pair of oxidant manifolds 220. In some embodiments, the at least one pair of fuel manifolds 210 are fluidly coupled to the anode layer of each fuel cell 120 in the stack assembly 100. In some embodiments, the at least one pair of oxidant manifolds 220 are fluidly coupled to the cathode layer of each fuel cell 120 in the stack assembly 100. In some embodiments, the plurality of reactant manifolds 200 may include more than one pair of fuel manifolds, more than one pair of oxidant manifolds, or both. The at least one pair of fuel manifolds 210 includes a fuel inlet manifold that supplies fuel to each fuel cell 120 and a fuel outlet manifold that discharges reaction products and unreacted fuel from each fuel cell 120 during operation of the fuel cell stack assembly 100. The at least one pair of oxidant manifolds 220 includes an oxidant inlet manifold that supplies oxidant (for example, air) to each fuel cell 120 and an oxidant outlet manifold that discharges oxidant from each fuel cell. The fuel cell stack assembly 100 further includes features for examples, channels or conduits to facilitate distribution of reactants to the anode chamber and the cathode chamber of each fuel cell in the fuel cell stack assembly 100. Also, contemplated within the scope of embodiments presented herein are embodiments wherein the fuel cell stack assembly may include different configurations including for example, different shape and sizes of interconnect plates, more than one pair of fuel manifolds or more than one pair of oxidant manifolds.

In some embodiments, the fuel cell stack assembly 100 operates at a temperature higher than 600 degrees Celsius. In some embodiments, the plurality of fuel cells 120 includes solid-oxide fuel cells that operate at a temperature in a range from about 700 degrees Celsius to about 900 degrees Celsius.

During operation, a fuel for example, a hydrocarbon pre-reformed or that is reformed within the fuel cell stack assembly 100, is supplied to fuel cell stack assembly 100 through a fuel inlet manifold of the pair of fuel manifolds 210. After entering the fuel inlet manifold, fuel is channeled to each anode chamber through each interconnect plate of the plurality of interconnect plates 140. The fuel flows over and reacts with each anode layer 126 prior to being discharged from the fuel cell stack assembly 100 through a fuel outlet manifold of the pair of fuel manifolds 210. Fuel and oxidant react in each fuel cell of the plurality of fuel cells 120, which are connected in series within the stack assembly 100, to build voltage to useful levels. The fuel reacts electrochemically with oxygen, supplied to the stack assembly 100 through an air inlet manifold of the pair of oxidant manifolds 220 to generate desired electricity with water as the main product. In some embodiments, the plurality of reactant manifolds 200 is arranged such that the reactants flow through the stack assembly 100 in opposite directions. In some other embodiments, the plurality of reactant manifolds 200 is arranged such that the directions of the reactants flow through the stack assembly 100 are substantially parallel and in the same direction. Current is generated as the fuel and oxidant react, and a voltage potential is generated across the stack assembly 100.

Referring to FIG. 1, the fuel cell stack assembly 100 includes a heating element 250 disposed in a reactant manifold of the plurality of reactant manifolds 200. The heating element 250 disposed in the reactant manifold 200 helps in increasing the temperature of the plurality of fuel cells 120 prior to or during the operation of the fuel cells in the stack assembly 100 as required. As illustrated, the heating element 250 extends to a length of the reactant manifold 200 (that may be substantially equal to the height 101 of the fuel cell stack assembly 100). In some embodiments, the heating element 250 has a length substantially equal to the length of the reactant manifold 200. The heating element 250 may be an electric heater or a gas heater. Suitable examples of the heating elements include rod heaters, strip heaters, tubular heaters, cartridge heaters, coils, flexible heaters e.g., cable heaters, tube heaters, rope heaters, or combinations thereof. In some embodiments, the heating element 250 includes a cartridge heater. A cartridge heater is a compact, tube-shaped, heavy-duty, industrial Joule heating element.

In some embodiments, the heating element 250 may have a protective coating (not shown in figures) on an outer surface of the heating element 250. In some embodiments, the heating element is coated with the protective coating. The protective coating may include a corrosion-resistant material. Examples of the corrosion-resistant materials include alloys of iron, chromium, nickel, titanium, zirconium, molybdenum, tantalum, or a combination thereof. In some embodiments, alloys including iron and chromium for example, stainless steel is a suitable example of the corrosion-resistant material. The protective coating protects the heating element 250 from a reactant (for example, fuel or air) that flow through the reactant manifold.

Figure 4:
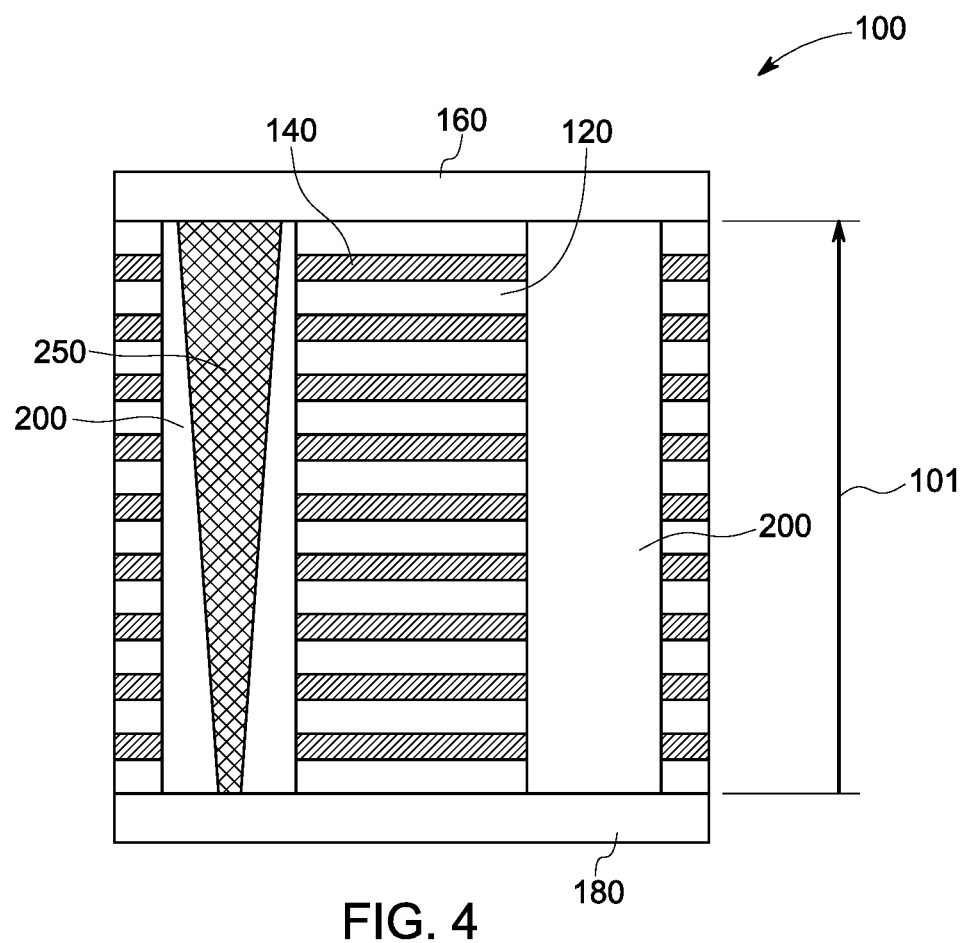
FIG. 4 is a schematic of a vertical cross-sectional view of a fuel cell stack assembly, in accordance with one embodiment of the disclosure.

In some embodiments, as illustrated in FIG. 1, the heating element 250 has a uniform cross-section area throughout the length of the heating element 250 (or the length of the reactant manifold 200). In some other embodiments, the heating element 250 may have varying (non-uniform) cross-section area along the length of the heating element 250. FIG. 4 illustrates some embodiments where the heating element 250 has a graded cross-section area along the length. As illustrated, the cross-section area of the heating element 250 increases from the bottom stack plate 180 to the top stack plate 160 of the stack assembly 100. This varied cross-section area of the heating element 250 along the length of the reactant manifold 200, provides varying area (for example, decreasing area) for reactant flow in the reactant manifold 200, which helps in controlling flow of reactants from the bottom stack plate to the top stack plate 160 (i.e., along the height) of the stack assembly 100. Accordingly, use of a heating element of non-uniform cross-section area along the length in a reactant manifold of the fuel cell stack assembly enables uniform supply of reactants to individual fuel cells in the stack assembly.

Figure 5:
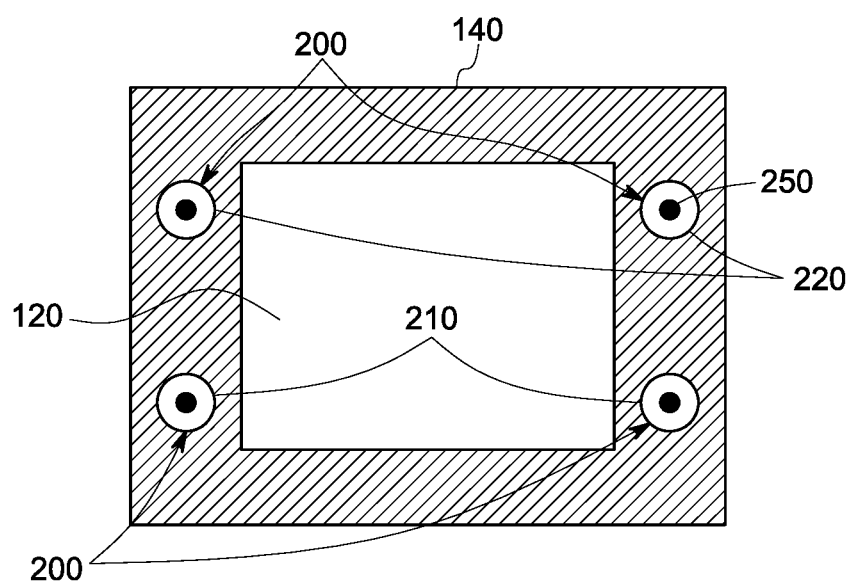
FIG. 5 is a schematic of a horizontal cross-sectional view of a fuel cell stack assembly, in accordance with one embodiment of the disclosure.
Figure 6:
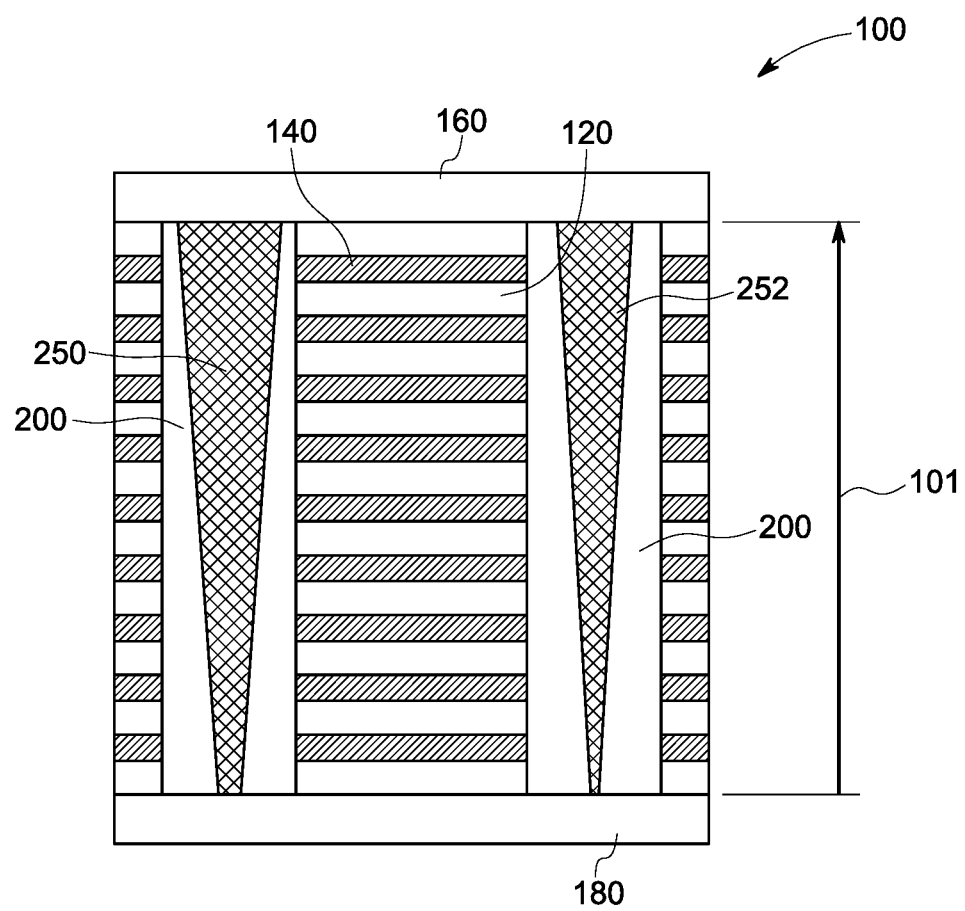
FIG. 6 is a schematic of a vertical cross-sectional view of a fuel cell stack assembly, in accordance with one embodiment of the disclosure.

In some embodiments, a plurality of heating elements is disposed in the plurality of reactant manifolds 200. For example, in some embodiments, each reactant manifold 200 includes one heating element 250 of the plurality of heating elements, independently, as shown on FIG. 5. In some embodiments, at least two reactant manifolds 200 for example, the fuel inlet manifold and the oxidant inlet manifold include the heating elements 250, independently. In some instances, the plurality of heating elements may have uniform or varying cross-section area along the length of the reactant manifolds. The plurality of heating elements 250 may be same in shape and size, in some embodiments. In some other embodiments, the plurality of heating elements may be different in shape and size depending on the reactant flow management requirements in the reactant manifolds. For example, FIG. 6 illustrates an embodiment where a heating element 250 disposed in a reactant manifold 200 is different in shape and size from another heating element 252 disposed in other reactant manifold 200 in the fuel cell stack assembly 100.

Figure 7:
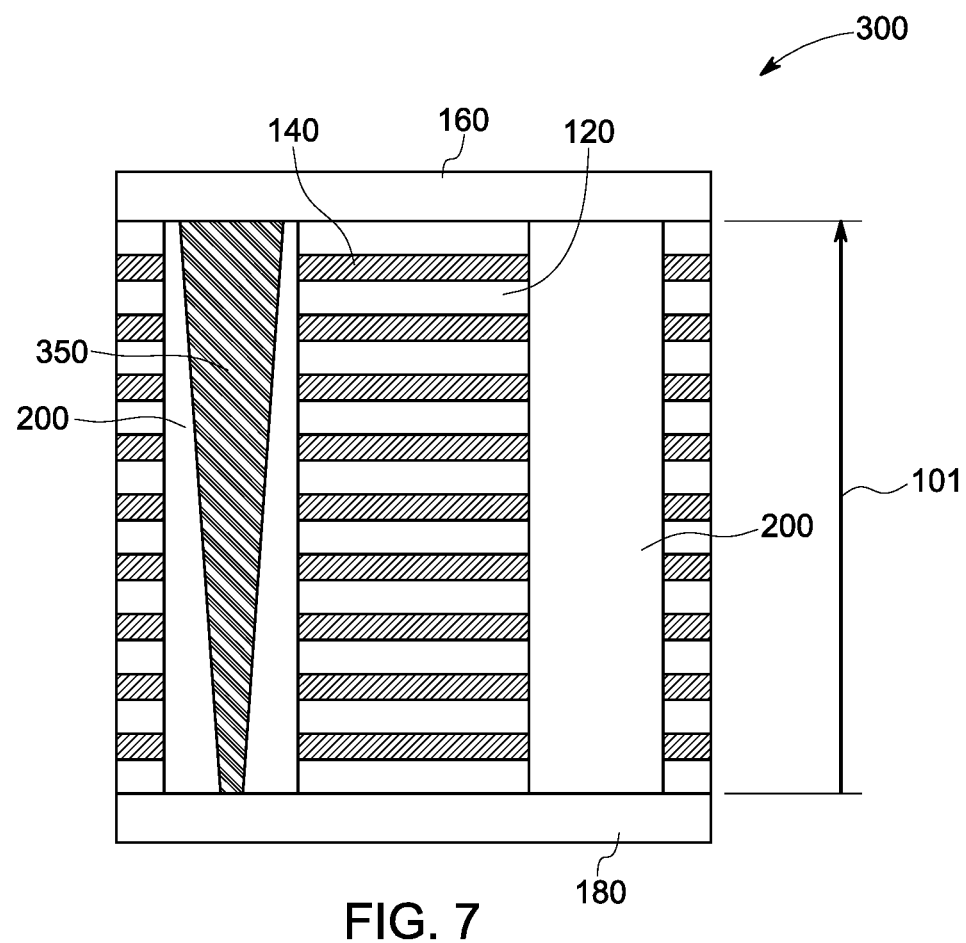
FIG. 7 is a schematic of a vertical cross-sectional view of a fuel cell stack assembly, in accordance with another embodiment of the disclosure.

Some embodiments are directed to a fuel cell stack assembly 300 including a longitudinal element 350 disposed in the reactant manifold 200, as shown in FIG. 7. The longitudinal element 350 extends along the length of the reactant manifold 200. In some embodiments, the longitudinal element 350 has a length substantially equal to the length of the reactant manifold 200. The longitudinal element 350 may have a varying (non-uniform) cross-section area along the length of the reactant manifold 200. In some embodiments, as illustrated in FIG. 7, the longitudinal element 350 has a graded cross-section area along the length. In some embodiments, the cross-section area of the longitudinal element 350 increases from the bottom stack plate 180 to the top stack plate 160 of the stack assembly 100. This graded cross-section area of the longitudinal element 350 along the length of the reactant manifold 200, provides varying area (for example, decreasing area) for reactant flow in the reactant manifold 200, which helps in controlling uniform flow of reactants from the bottom stack plate to the top stack plate 160 (i.e., along the height) of the stack assembly 300.

The longitudinal element 350 includes a material that is thermally and chemically stable at the operating environment of the fuel cell. In some embodiments, the longitudinal element 350 is made of a corrosion-resistant material. In some embodiments, the longitudinal element 350 may be made of any suitable material that can withstand temperatures up to about 850 degrees Celsius and coated with a corrosion-resistant material. Examples of the corrosion-resistant materials include alloys of iron, chromium, nickel, titanium, zirconium, molybdenum, tantalum, or a combination thereof. In some embodiments, alloys including iron and chromium for example, stainless steel is a suitable example of the corrosion-resistant material.

Figure 8:
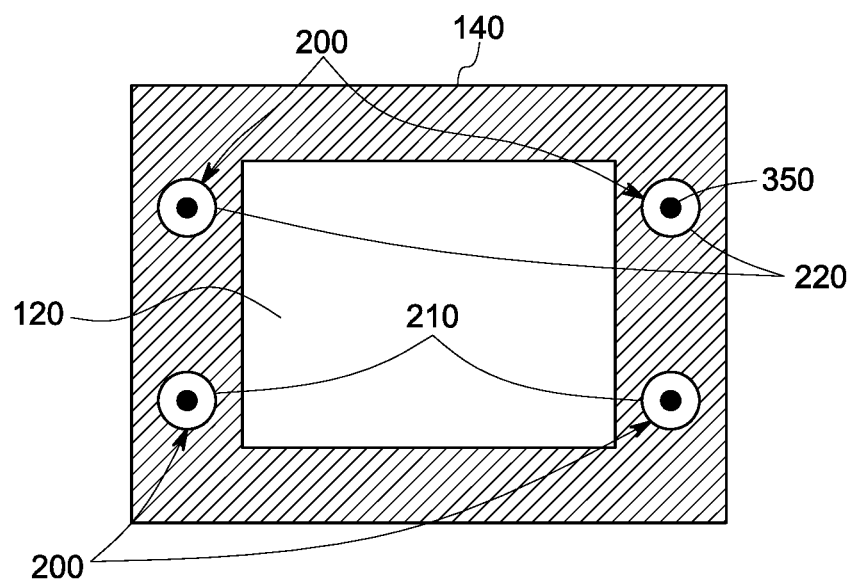
FIG. 8 is a schematic of a horizontal cross-sectional view of a fuel cell stack assembly, in accordance with yet another embodiment of the disclosure.
Figure 9:
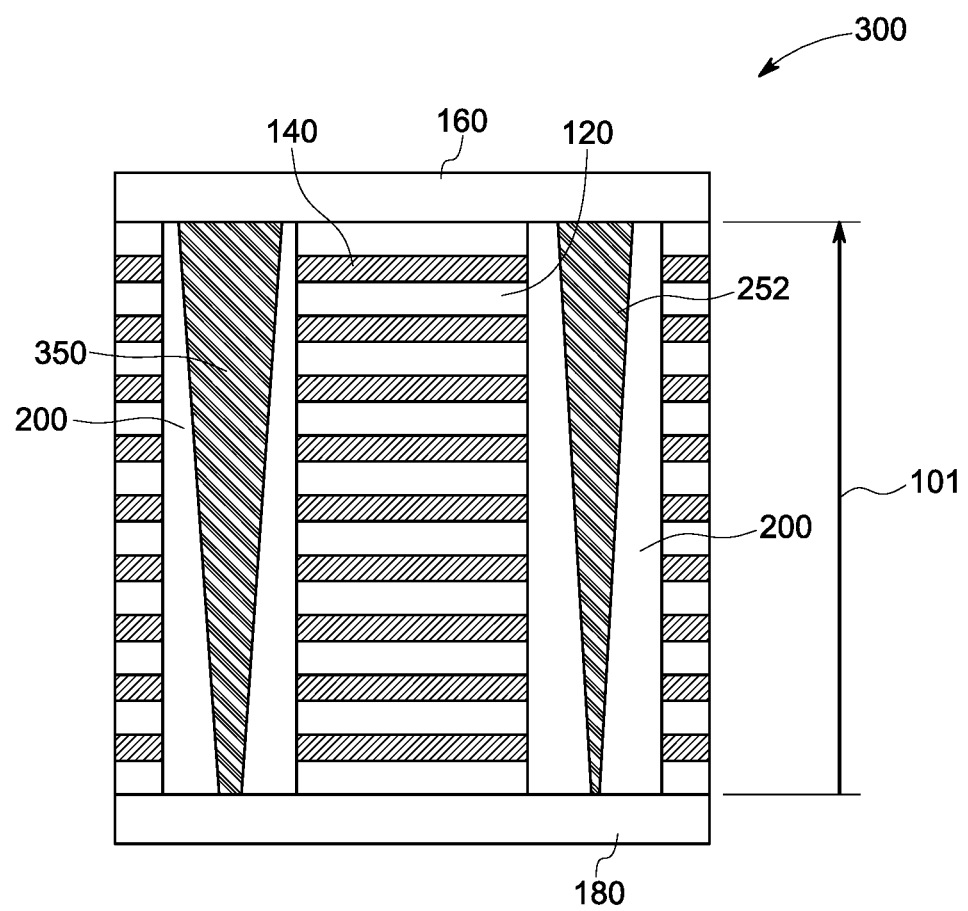
FIG. 9 is a schematic of a vertical cross-sectional view of a fuel cell stack assembly, in accordance with yet another embodiment of the disclosure.

In some embodiments, a plurality of longitudinal elements is disposed in the plurality of reactant manifolds 200. For example, in some embodiments, each reactant manifold 200 includes one longitudinal element 350 of the plurality of longitudinal elements, independently, as shown on FIG. 8. In some embodiments, at least two reactant manifolds 200 for example, the fuel inlet manifold and the oxidant inlet manifold include the longitudinal elements 350, independently. In some instances, the plurality of longitudinal elements may have varying cross-section area along the length of the reactant manifolds. The plurality of longitudinal elements 350 may be same in shape and size, in some embodiments. In some other embodiments, the plurality of longitudinal elements may be different in shape and size depending on the reactant flow management requirements in the reactant manifolds. For example, FIG. 9 illustrates an embodiment where a longitudinal element 350 disposed in a reactant manifold 200 is different in shape and size from other longitudinal element 352 disposed in another reactant manifold 200 in the fuel cell stack assembly 300.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A fuel cell stack assembly comprising:
   a plurality of fuel cells;
   a plurality of interconnect plates, wherein each interconnect plate of the plurality of interconnect plates is disposed between a pair of fuel cells of the plurality of fuel cells;
   a plurality of reactant manifolds defined by the plurality of interconnect plates; and
   a heating element disposed in a reactant manifold of the plurality of reactant manifolds,
   wherein the heating element extends along a length of the reactant manifold and has a graded cross-section area along said length of the reactant manifold, and wherein the heating element has a circular cross-section area along a plane perpendicular to a stacking direction of the plurality of interconnect plates.

2. The fuel cell stack assembly of claim 1, wherein each fuel cell of the plurality of fuel cells includes an anode layer, a cathode layer, and an electrolyte layer interposed between the anode layer and the cathode layer.

3. The fuel cell stack assembly of claim 1, wherein each interconnect plate is disposed between an anode layer of a first fuel cell of the pair of fuel cells and a cathode layer of a second fuel cell of the pair of fuel cells.

4. The fuel cell stack assembly of claim 1, wherein each fuel cell of the plurality of fuel cells comprises a solid-oxide fuel cell.

5. The fuel cell stack assembly of claim 1, wherein the plurality of reactant manifolds comprises at least one pair of fuel manifolds and at least one pair of oxidant manifolds.

6. The fuel cell stack assembly of claim 5, wherein the at least one pair of fuel manifolds are fluidly coupled to an anode layer of each fuel cell of the plurality of fuel cells.

7. The fuel cell stack assembly of claim 5, wherein the at least one pair of oxidant manifolds are fluidly coupled to a cathode layer of each fuel cell of the plurality of fuel cells.

8. The fuel cell stack assembly of claim 1, wherein the plurality of reactant manifolds extends along a height of the fuel cell stack assembly.

9. The fuel cell stack assembly of claim 1, wherein the heating element comprises a protective coating on an outer surface of the heating element.

10. The fuel cell stack assembly of claim 1, wherein the heating element comprises a cartridge heater.

11. The fuel cell stack assembly of claim 1, wherein a plurality of heating elements is disposed in the plurality of reactant manifolds.

12. The fuel cell stack assembly of claim 11, wherein each heating element of the plurality of heating elements is disposed in each reactant manifold of the plurality of reactant manifolds.

13. The fuel cell stack assembly of claim 11, wherein the corresponding circular cross-section areas of two of the plurality of heating elements are different from one another, the circular cross-section areas being along a same one of the planes perpendicular to the stacking direction of the plurality of interconnect plates.

14. A fuel cell stack assembly comprising:
a plurality of fuel cells;
a plurality of interconnect plates, wherein each interconnect plate of the plurality of interconnect plates is disposed between a pair of fuel cells of the plurality of fuel cells;
a plurality of reactant manifolds defined by the plurality of interconnect plates; and
a longitudinal element disposed in a reactant manifold of the plurality of reactant manifolds, wherein the longitudinal element extends along a length of the reactant manifold and has a graded cross-section area along the length of the reactant manifold, and wherein the longitudinal element has a circular cross-section area along a plane perpendicular to a stacking direction of the plurality of interconnect plates.

15. The fuel cell stack assembly of claim 14, wherein a plurality of longitudinal elements is disposed in the plurality of reactant manifolds.

16. The fuel cell stack assembly of claim 15, wherein each longitudinal element of the plurality of longitudinal elements is disposed in each reactant manifold of the plurality of reactant manifolds.

17. The fuel cell stack assembly of claim 15, wherein the corresponding circular cross-section areas of two of the plurality of longitudinal elements are different from one another, the circular cross-section areas being along a same one of the planes perpendicular to the stacking direction of the plurality of interconnect plates.

\* \* \* \* \*